United States Patent

Tsoras et al.

[15] 3,688,295
[45] Aug. 29, 1972

[54] ELECTRONIC TEMPERATURE MONITORING SYSTEM

[72] Inventors: John Tsoras, 553 Damon St., Akron, Ohio 44310; Melvin H. Davis, 57 Karen Lane, Northfield Center, Ohio 44067; David P. Bickel, 2606 Oak Park Blvd., Cuyahoga Falls, Ohio 44221; Karl H. Starks, Jr., 536 Woodland Dr., Tallmadge, Ohio 44278

[22] Filed: Oct. 21, 1969

[21] Appl. No.: 868,096

[52] U.S. Cl................340/227 R, 73/340, 307/235, 340/213 R, 340/228 R, 340/248 A
[51] Int. Cl............................................G08b 17/06
[58] Field of Search..340/227, 228, 231, 248 A, 412, 340/415, 184, 181, 213; 73/341, 340, 342; 307/235

[56] References Cited

UNITED STATES PATENTS

| | | | |
|---|---|---|---|
| 2,731,627 | 1/1956 | Herbst | 340/213 |
| 3,573,776 | 4/1971 | Dick | 340/228 |
| 2,901,739 | 8/1959 | Freitas | 340/413 |
| 3,416,004 | 12/1968 | Taylor | 307/235 |
| 3,427,607 | 2/1969 | Oesterle | 340/248 A |
| 3,453,448 | 7/1969 | Close | 307/235 |
| 3,468,164 | 10/1969 | Sutherland | 340/228 X |
| 3,509,768 | 5/1970 | Reynolds et al. | 73/361 X |
| 3,512,010 | 5/1970 | Washburn | 307/235 X |
| 3,065,462 | 11/1962 | Maltby et al. | 340/228 X |
| 3,444,467 | 5/1969 | Cliffgard | 340/248 |

*Primary Examiner*—John W. Caldwell
*Assistant Examiner*—Scott F. Partridge
*Attorney*—F. W. Brunner, P. E. Milliken and Oldham & Oldham

[57] ABSTRACT

The invention comprises integrated circuits, solid-state devices and discrete components mounted on printed circuit boards cooperating with a thermocouple mounted in sensing locations to produce an indication of temperature at such locations. The thermocouple signals are amplified by a high gain precision amplifier, compensated for thermal environment and compared to predetermined high temperature levels. The comparator design includes a hysteresis effect which prevents the comparator circuit from hunting if the temperature is hovering around the predetermined temperature level. A digital logic network controls the activation of visual or sound indications to show the high temperature. An automatic override feature prevents continuous activation of the display system if a thermocouple fails by open circuitry.

7 Claims, 5 Drawing Figures

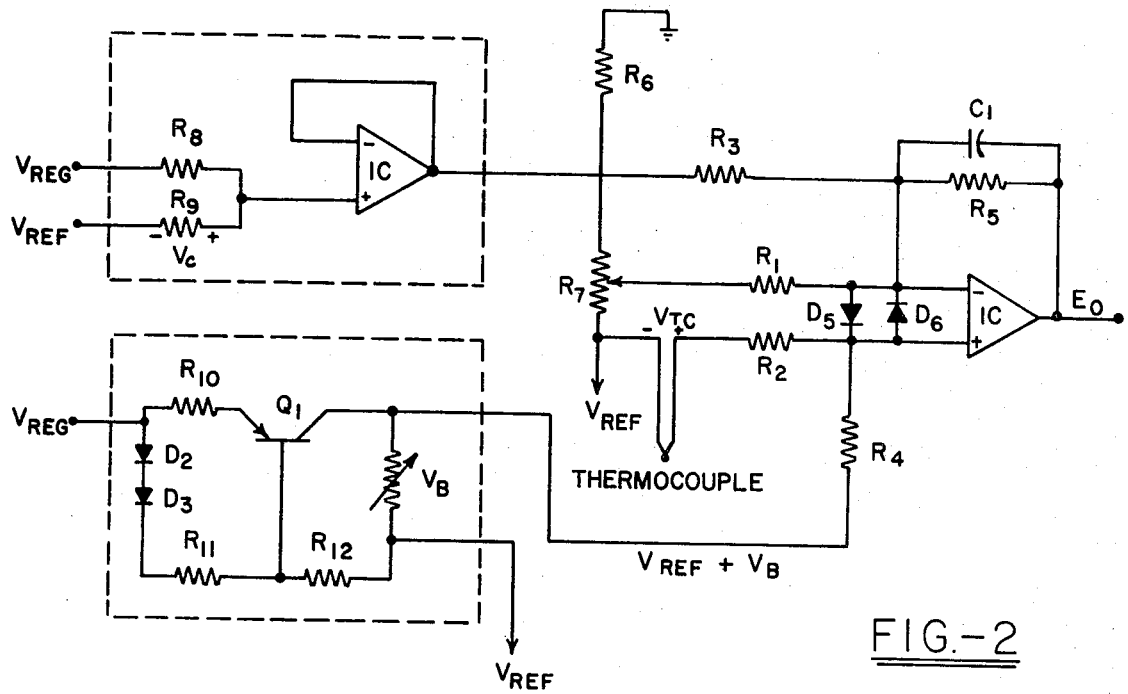
FIG.-2
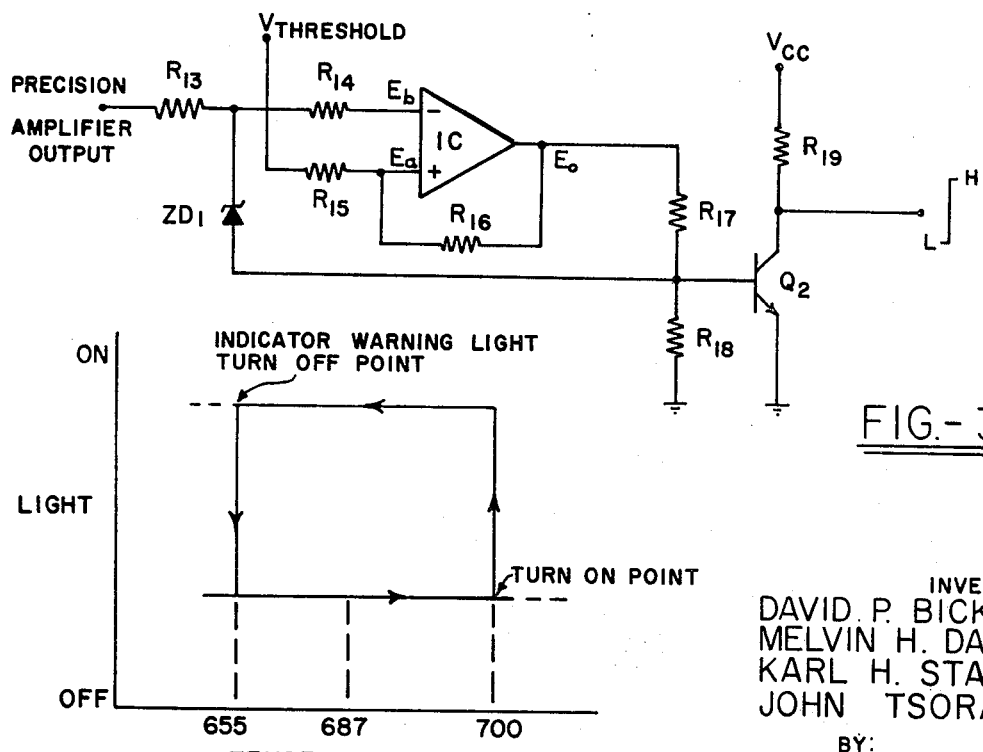
FIG.-3
FIG.-4
INVENTORS
DAVID P. BICKEL
MELVIN H. DAVIS
KARL H. STARKS, JR.
JOHN TSORAS
BY:
Oldham & Oldham
ATTORNEYS

ELECTRONIC TEMPERATURE MONITORING SYSTEM

Heretofore it has been known that there have been many and various types of thermal indication sensing systems, particularly adapted for use with braked wheels to sense high brake temperatures which could mean brake failure if the brakes were continually operated at such high temperatures or beyond their yield points. These prior art systems, however, have been somewhat inflexible, unreliable, and expensive. Therefore, it is the general object of the present invention to provide a highly reliable, flexible system for temperature indication of braked wheels specifically, but for any thermal function generally, that is relatively inexpensive, but highly reliable and able to adapt to a variety of circumstances and situations.

A further object of the invention is to include a compensation associated with the thermocouple wire transition to copper that compensates for the thermal environment of the junction so as to provide accuracy regardless of the operation of the system in cold or hot weather.

The system further incorporates a comparator design including a hysteresis effect which prevents the comparator circuit from cycling or hunting from one state to another if the brake temperature is hovering around the critical point.

A further object of the invention is to include an override circuit which eliminates a continuous warning light for a signal equivalent to much above what could possibly be present in the brake indicating a breakdown of the system. Remaining channels are uneffected and operate an overheat light in the normal manner.

For a better understanding of the invention reference should be had to the accompanying drawings wherein:

FIG. 2 is an enlarged circuit diagram of the input high gain precision amplifier circuit;

FIG. 3 is an enlarged schematic diagram of a comparator circuit with hysteresis, interface circuit, and override circuit incorporated therein;

FIG. 4 is a graphic illustration of the hysteresis effect for the comparator circuit.

Figure 1:
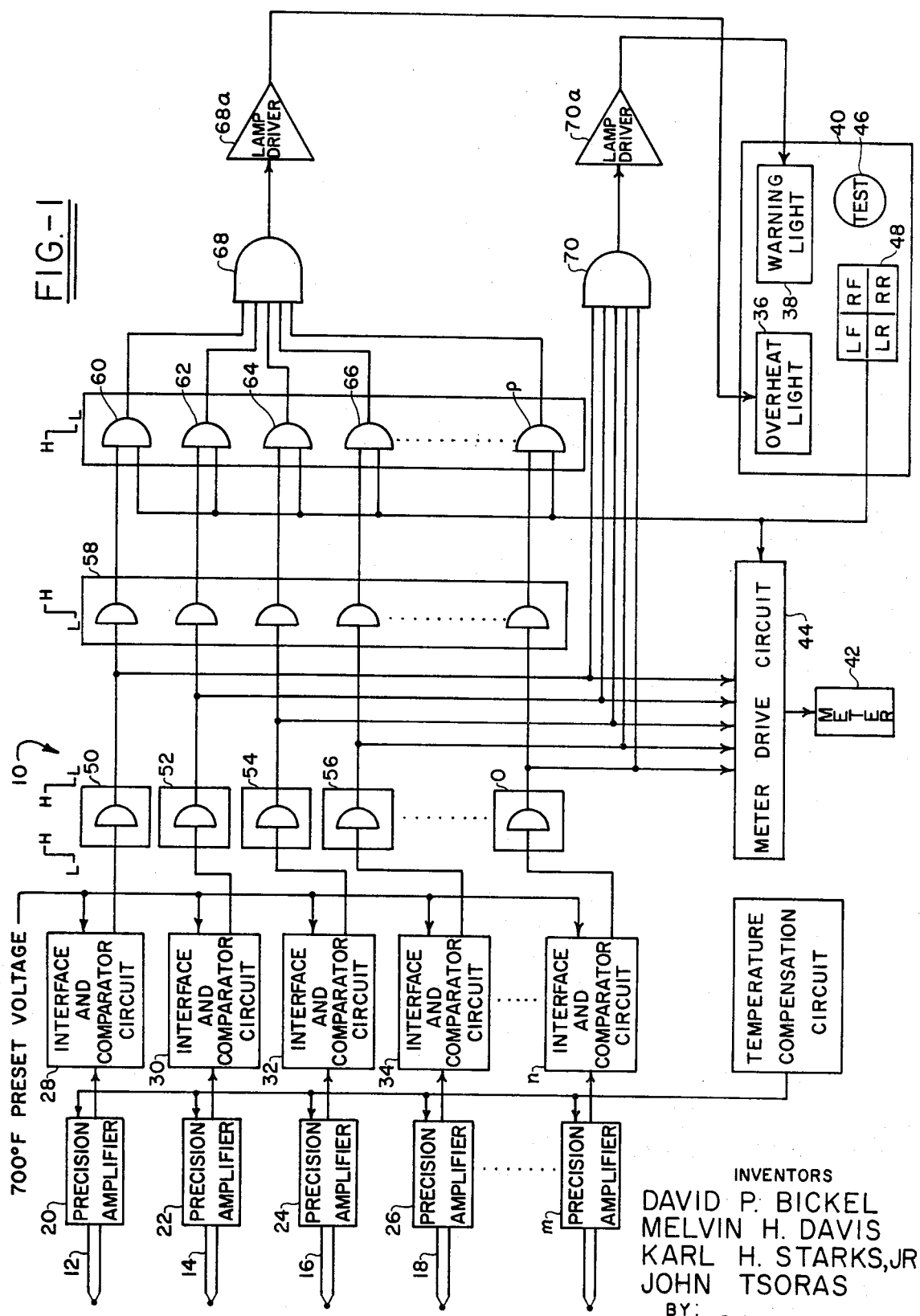
FIG. 1 is a schematic diagram of a preferred embodiment of the temperature indicating system indicating four thermocouples.

With reference to the form of the invention illustrated in the drawings, the numeral 10 indicates generally a simplified circuit schematic showing four thermocouple inputs 12 through 18. The thermocouples generate electrical signals which fall in the millivolt range. Each signal is fed into the positive input of a high gain precision amplifier 20 through 26. Each amplifier output is fed to the negative input of a respective comparator circuit 28 through 34. Similarly, the outputs from the amplifiers corresponding to other thermocouple inputs (not shown) are each fed to their appropriate comparator. There may be any number of total comparator circuits for an overall system. The function of each comparator is to determine whether the output of the amplifier feeding it is greater than a present voltage level corresponding to 700° F., for example in an aircraft brake unit, which is provided as a positive input to the respective comparator. The output of each of the comparators is normally in the "high" state and the output of the following interface circuit is normally in the "low" state, which is indicated in FIG. 1. When the amplifier input to a comparator exceeds the preset voltage level the comparator output switches to a "low" state forcing the interface circuit to switch to a "high" state. Included in the comparator design is a hysteresis effect which prevents the comparator circuit from cycling from one state to another if the brake temperature is hovering around 700° F., and this effect will be more fully described hereinafter with respect to the specific circuitry.

The outputs from the comparator circuits 28 through 34 feed into a digital logic network which controls the activation of an overheat light 36 and a warning light 38 located in a control panel 40 in an appropriate location. Meter display on a meter 42 actuated by a meter drive circuit 44 is also provided by the system. The control panel 40 is set up so as to provide a test button 46 that simply provides a signal through each precision amplifier that indicates high temperature to see if warning lights are energized to reflect that condition. It should also be noted that the particular control panel 40 illustrated shows a set up for an aircraft strut which includes a left front, right front, left rear, and right rear wheels. Depression of the LF switch will connect the appropriate meters to the circuitry associated with the left front wheel of the strut to display brake temperature and drive the meter 42 for that particular brake. Similarly, depression of the RF switch will select a display of temperature for the right front wheel of the strut. The meter circuitry is driven electrically from the outputs of the high gain precision amplifiers which are wired through the selector switch 48 so that the meter driver circuit will provide a drive current directly proportional to voltage only.

DIGITAL LOGIC CIRCUITRY

The logic devices used are of two types. (1) dual four input Nand/Nor gates and (2) quad two input Nand/Nor gates. The output of the interfacing circuit for the left front, left rear, right front and right rear wheel positions of all the wheels on a particular strut are connected to the input leads of gates 50 through 56, respectively. The input signal to gates 50 through 56 are normally in the "low" state and switched to a "high" state when an overheat condition occurs in one or more of the brakes. The outputs of gates 50 through 56 are wired in "OR" configuration and connected to one of the inputs of gate 58. The input signals of gate 58 are normally in the "high" state and switched to the "low" state when an overheat condition occurs in one or more of the brakes. The four or more outputs of gate 58 are respectively connected to one of the inputs of gates 60 through 66. The second inputs of gate 60 through 66 are connected to the selective switch 48 which allows the flight engineer to select a desired wheel position signal to filter through the logic circuitry. This is accomplished by grounding the appropriate inputs of gates 60 through 66 by depressing one of the wheel position selector switches on the selector switch 48. This allows only the signals from the desired position to filter through the logic circuitry to turn overheat warning light 36 on if an overheat condition has occurred for that wheel position on the strut.

The outputs of gates 60 through 66 are connected to the inputs of gates 68. The inputs to gate 68 are normally in the "high" state. When one or more of the inputs switch to the "low" state due to an overheat condition occurring in one or more of the brakes, the output of gate 68 switches from a "low" state to a "high" state and turns on the brake overheat warning light 36. The warning light will remain on until the input which caused the logic circuitry to trigger is returned to its original state as a result of a reduction in brake temperature below 655° F.

The outputs of gates 50 through 56 are also respectively connected to the inputs of gate 70. The output of gate 70 is connected to the pilots "brake overheat" warning light 38, and is normally in a "low" state.

The chain of events leading to overheat light activation are as follows: for purposes of this description it is assumed that the brake temperature monitoring system is operating normally and that all the inputs to the logic circuitry are in their normal state. When an overheat condition occurs in one of the brakes, for example, the one with the left front position, the output of the comparator 28 for that particular left front wheel position will switch from a "high" state to a "low" state causing the interface circuit connected to it to switch from a "low" state to a "high" state. The output of the interface circuit is connected to the inputs to gate 50. When it switches to a "high" state, the OR'd output of gate 50, which is connected to one of the inputs of gate 58 switches to a "low" state. The output of gate 58 which is connected to one of the inputs of gate 60, then switches to a "high" state. The output of gate 60 which is connected to one of the inputs of gate 68 switches from a "high" state to a "low" state. This causes the output of gate 68 which feeds the brake overheat warning light driver 68a to switch to a "high" state and turn on the light 36. At the same time, the OR'd output of gate 50 is also connected to one of the inputs of gate 70. When the input of gate 70 switches from a "high" state to a "low" state its output switches from a "low" state to a "high" state. When the output of gate 70 switches, the warning light 38 is turned on by the lamp driver 78.

Therefore, for an overheat condition of one or more of the brakes, both the flight engineers and pilots brake overheat warning lights 36 and 38, respectively are turned on. To determine exactly which wheel or wheels have overheated brakes, the flight engineer can interrogate by depressing one of the wheel position buttons on the switch 48. When the flight engineer depresses the LF position switch, the wheel position selector will provide a "low" input to gates 62, 64, 66, which will disengage those gates so that only the logic circuitry associated with the left front wheel position will allow an input signal to filter through the circuitry and turn on the overheat warning light 36 on the indicator unit. Similarly, as the rest of the wheel position buttons on the selector switch are depressed, the appropriate gates are disengaged, and only a signal from the wheel position chosen can cause the warning light on the indicator unit to turn on.

During the time the flight engineer is interrogating the system to determine which wheel position on which strut is overheated, the pilot's warning light circuitry continues monitoring all wheel positions. When an open sensor condition occurs, the output from the interface circuit is maintained at a low state by the automatic override failsafe circuit as will be described hereinafter. Since an open sensor does not turn on the warning light, the only way it can be detected is by the meter reading. The exact wheel in which the open sensor is located can be determined only by interrogating via the selector switch 48 to find out which wheel position provides a full scale deflection of the meter readout. A sensor shorted to the common reference will cause a meter to read its initial setting while the other three meter read normally. A sensor shorted to ground will cause all meter indications for the strut on which the short occurs to read zero since the reference voltage is shorted to ground.

While all the foregoing discussion has related to only four thermal sensors, amplifiers, etc., it should be understood that a great many more amplifiers up to M and interface and comparator circuits to N, and respective logic gates might appropriately cooperate with the system in exactly the same manner as described heretofore. In addition, these extra sensors would cooperate with switch 48, so that flight engineer can determine specifically which brakes or sensors are overheating, while the pilot is continuously monitoring high temperature indication. These additions are quite obviously within the skill of one in the art and are contemplated by the invention.

HIGH GAIN PRECISION AMPLIFIERS

The accuracy of the temperature monitoring system described above is greatly dependent upon the high gain precision amplifier circuit shown in FIG 2. The thermocouple input voltage is applied to the positive input of integrated circuit operational amplifier. This input is amplified by a fixed amplifier gain which is determined by resistors R1, R2, R3, R4, and R5. Resistor R6 is used to limit the current which flows through potentiometer R7. Potentiometer R7 is used for initial adjustment and to compensate for the input offset voltage of the operational amplifier. Capacitor C1 filters out high frequency noise at the input of the operation amplifier. When the terminal leads of the thermocouple are set at some reference temperature, for example 0° C. or 32° F., and the measuring junction is heated, voltage is generated.

It has also been determined that the input stage of the operational amplifier can be permanently degraded or destroyed by exceeding the common mode input range. The parallel front-to-back diodes, D5 and D6 provide the necessary protection to keep induced transient signals applied at the amplifier input from exceeding the common mode input range of the precision amplifier.

The high gain precision amplifier outputs are connected to the input of the comparator circuit and to the operational amplifiers used to drive the meters.

COMPARATOR CIRCUIT WITH HYSTERESIS

The comparator circuit shown in FIG. 3 is used to determine whether the output of a precision amplifier circuit has exceeded the voltage equivalent of a warning temperature of 700° F., as a typical example. A hysteresis effect is incorporated to prevent cycling and indicator warning light on and off if the brake or sensor temperature oscillates around 700° F. The hysteresis effect is shown graphically in FIG. 4.

An approximate 45° spread between turn-on and turn-off of the comparator is desired. A reference center point of 687° F. has been selected as a typical example.

The comparator input voltage $E_b$ at which the comparator output level should switch can be defined as being the reference voltage plus the increase in the amplifier output voltage. Since the output of the comparator is normally in the high state (plus 16 volts) and is at a higher potential than the threshold voltage, the current flowing through R15 is equal to $E_b - V_{THRESHOLD})/(R15)$. If a resistance value is chosen for R15, then current $I_{R15}$ can readily be determined to insure that $E_a$ equals $E_b$.

When the comparator output has switched to the low state (less than 1 volt), the voltage level at the non-inverting input of the comparator changes to the following:

$$E_a = \frac{R16}{R15+R16} (V_{\text{Threshold}} - E_o)$$

The inverting input to the comparator (precision amplifier output) must then decrease until it is less than the value of $E_a$ given above before the comparator output will return to the high voltage level. This will occur at approximately 655° as indicated by the hysteresis cycle of the graph of FIG. 4.

COMPARATOR/LOGIC INTERFACE CIRCUIT

The comparator output is connected to the interface circuit as shown in FIG. 3. The interfacing circuit is used to reduce the 16 volt output swing of the comparator to a voltage level compatible with the input of the logic circuitry.

With the comparator output normally in the "high" state, transistor $Q_2$ is biased "on" by appropriate selection of the resistors $R_{17}$ and $R_{18}$. The collector of $Q_2$, which is connected to the input of the logic circuitry shown in FIG. 1, is normally held at a potential slightly above ground. When the comparator output level switches to the "low" state, the base-emitter junction of transistor $Q_2$ becomes reversed biased and transistor $Q_2$ is turned off. The collector voltage then increases to the $V_{CC}$ voltage level which is compatible with the specified logic input voltage level. Transistor current limiting is provided by resistor $R_{19}$, as seen in FIG. 3.

OPEN SENSOR OVERRIDE CIRCUIT

An open thermocouple appears as a large continuous input to the system which would normally cause the comparator input to exceed the threshold level and trigger a false overheat condition. To prevent this from occurring an automatic override circuit is provided, and is indicated in FIG. 3 by resistor $R_{13}$ and zener diode ZD1 which prevents the overheat warning light from being activated for an input equivalent to a temperature of about 1,500° F. or greater depending on the particular system. When a thermocouple opens, the precision amplifier output increases to the regulated voltage level. This level is high enough to turn the zener diode on and provide a current conduction path through R13, ZD1, and the base-emitter junction of Q2. Although the comparator output switches to the low state when its inverting input exceeds the threshold level, the output of the interface circuit remains in the low state due to transistor Q2 still being biased on. The remaining channels are unaffected and continue to monitor the brake temperature in the normal manner.

TEMPERATURE COMPENSATION CIRCUIT

Figure 5:
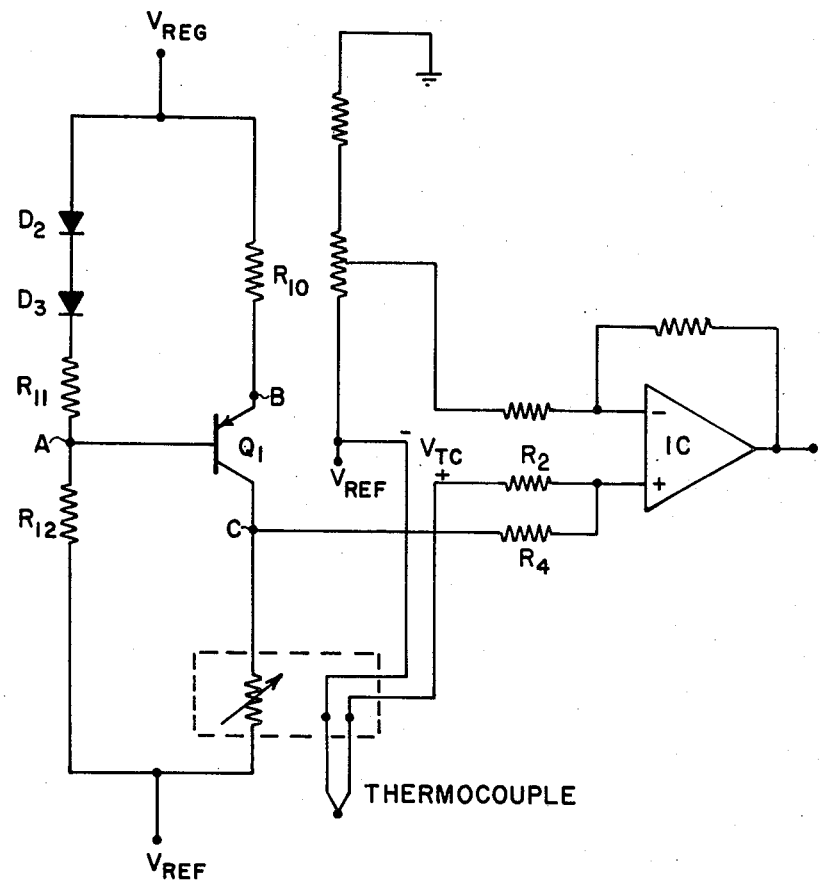
FIG. 5 is a schematic diagram of the temperature compensation circuit.

For a thermocouple output to be useful, it is necessary to know the temperature of the monitoring terminals. Since the cold junctions of the thermocouples used in sensing brake temperatures are located in junction boxes mounted on the struts, it is impossible to maintain a constant specific reference temperature. For this reason temperature compensation is required to provide the accuracy desired. The temperature compensation circuit used is shown in FIG. 5.

The voltage level at point A can be determined by the following relationship, if the value of R11 and R12 are known and if the diode drops are assumed to be 0.6 volts.

$$V pt. A = \frac{R12}{+R11+R12} (V_{\text{reg}} - 2V_D - V_{\text{REF}}) + V_{\text{REF}}$$

The voltage at point B will then be equal to the voltage at point $A$ plus 0.6 volt due to the base-emitter voltage drop of Q1.

$$V \text{ pt. } B = V \text{ pt. } A + 0.6 \text{ volts}$$

With $V$reg. and $V$pt. $B$ known quantities, the resistor value of R10 which will cause 1ma of current to flow through the platinum resistance compensator can be computed.

For a constant hot junction measuring temperature, the thermocouple output will decrease as the junction box temperature increases above the 32° F. reference temperature. However, the 500 ohm platinum resistance compensator unit which has the constant current flowing through it will cause the voltage at pt. C to increase since the resistance value of the compensator increases linearly with an increase in temperature. Similarly for a constant hot junction measuring temperature, the thermocouple output will increase as the junction box temperature decreases below the 32° F. reference temperature. However, the 500 ohm platinum resistance compensator unit with the constant current flowing through it causes the voltage at pt. C to decrease since the resistance value of the compensator decreases linearly with a decrease in temperature. By determining the proper ratio between resistors R2 and R4 temperature compensation at the amplifier input can be implemented to offset the ambient temperature change at the junction box.

Hence, it is seen that the objects of the invention have been achieved by providing a thermocouple sensing in combination with a comparator, an interfacing network, and digital logic to indicate high temperature in brake units, as a typical example, or a selective readout of particular units, as desired. The comparator circuit utilizes a hysteresis and override feature to prevent hunting and damage in case of sensor failure.

While in accordance with the patent statutes, only the preferred embodiment of the invention has been illustrated and described, it should be understood that the invention is not limited thereto or thereby, but that the inventive scope is defined in the appended claims.

What is claimed is:

1. An electronic system for monitoring temperatures at a plurality of points, comprising:
    a plurality of temperature sensors, one sensor being located at each of the points to be monitored and each sensor producing an electrical signal proportional to the temperature at the corresponding point;
    an equal plurality of amplifier means, one amplifier means being associated with each sensor to receive and amplify the electrical signal for the sensor;
    an equal plurality of comparator circuits, one comparator circuit being associated with each amplifier means to compare the amplifier output signal to a reference signal and produce a first output signal when the amplifier signal is less than the reference signal; and
    a second output signal when the amplifier signal exceeds the reference signal;
    a pair of indicator means;
    a first logic circuit between the comparator circuit and one indicator means receiving the output from all the comparator circuits and energizing said one indicator means whenever at least one second output signal is received from the comparitor circuits,
    a second logic circuit receiving the output signals from all the comparator circuits and energizing the other indicator means whenever at least one second output signal is received for the comparator circuits, and
    a selector switch operative to select any one of the plurality of comparator circuits and to remove the outputs of the remaining comparator circuits from the second logic circuit without any change in the operation of the first logic circuit whereby an indication of the condition of the sensor corresponding to the selected comparator circuit may be obtained at the other indicator means.

2. A system according to claim 1 which includes a separate junction box located nearby the sensor receiving the output from each respective sensor and means to compensate for the thermal environment of the junction boxes according to a predetermined standard.

3. A system according to claim 2 where said means to compensate includes for each sensor a first circuit to generate a separate signal indicative of the thermal environment of the junction box and a second circuit receiving said separate signal and combining it with the electrical signal generated by the respective sensor,
    a temperature proportionally varing resistor in said first circuit, means to provide a constant current supply to said resistor, said first circuit producing a predetermined junction box temperature, a proportionally higher output signal above said predetermined temperature, and a proportionally lower output signal below said predetermined temperature.

4. A system according to claim 3 adapted for use on aircraft brakes associated with wheels mounted to struts to sense the temperature thereof which includes a separate junction box mounted to each strut receiving inputs from the sensors associated with the respective wheels carried by said strut.

5. A system according to claim 1 where the comparator circuit comprises an interface comparator having the amplifier output as one input and a threshold signal as another input, said comparator normally operating in the high state, a resistor positioned between the comparator output and the threshold signal input of such value that the amplifier output must have a significant decrease before the comparator switches to the low state.

6. A system according to claim 1 which includes an override circuit comprising a zener diode which is biased to conduction upon a predetermined maximum signal from the sensor to prevent the comparator from functioning.

7. The temperature monitoring system according to claim 1 which includes circuit means within each comparator circuit to provide hysteresis of the switching between first and second output signals.

* * * * *